United States Patent [19]

Hamada et al.

[11] Patent Number: 5,050,837
[45] Date of Patent: Sep. 24, 1991

[54] MUFFLER HOLDING MEMBER

[75] Inventors: Masaaki Hamada; Yoshio Iida, both of Komaki; Motohiro Katayama, Kasugai; Ikuo Sasaki, Komaki, all of Japan

[73] Assignee: Tokai Rubber Industries, Ld., Komaki, Japan

[21] Appl. No.: 498,741

[22] Filed: Mar. 23, 1990

[30] Foreign Application Priority Data

Aug. 1, 1989 [JP] Japan .................................. 1-199903

[51] Int. Cl.[5] ............................................. F16M 13/00
[52] U.S. Cl. ..................................... 248/610; 248/58; 267/141
[58] Field of Search ............... 248/610, 613, 611, 612, 248/568, 58, 60, 317; 267/141; 181/208

[56] References Cited

U.S. PATENT DOCUMENTS

| 4,380,324 | 4/1983 | Woesler | 248/610 |
| 4,660,797 | 4/1987 | Tonnies | 248/610 |
| 4,727,957 | 3/1988 | Fujita | 248/613 X |
| 4,746,104 | 5/1988 | Probst | 248/60 X |
| 4,817,909 | 4/1989 | Deane | 248/610 |
| 4,893,778 | 1/1990 | Drabing et al. | 248/610 |

FOREIGN PATENT DOCUMENTS 1505498 9/1969 Fed. Rep. of Germany .
2658358 6/1978 Fed. Rep. of Germany .

Primary Examiner—Ramon O. Ramirez
Attorney, Agent, or Firm—Berman & Aisenberg

[57] ABSTRACT

An elliptical-shaped, plate type muffler holding member made of an elastic material having the structure of: a first holding part having a first through hole into which a supporting member of an automotive body side is to be inserted, a second holding part formed with a space between the first holding part and having a second through hole into which a supporting member of a muffler side is to be inserted, a pair of side parts connecting the first holding part and the second holding part at the both sides thereof, and a center connecting part positioned in the space between the first and second holding parts and integrally connected to each side part at the central portion thereof. According to the present invention, the muffler holding member has the center connecting part made of an elastic material and therefore, tensile and compression stresses are working in the center connecting part. In effect, the muffler holding member of the present invention is capable of lowering vibration transmissibility in any frequency level up to 800Hz required to an automobile.

6 Claims, 3 Drawing Sheets

MUFFLER HOLDING MEMBER

BACKGROUND OF THE INVENTION

1. Field of the Invention

This invention relates to a muffler holding member retaining a muffler to an automotive body and absorbing the vibrations caused by the operation of the internal combustion engine of an automobile and transmitted from the muffler or automotive body.

2. Description of the Prior Art

FIG. 5 illustrates an well-known conventional type muffler holding member. This conventional type muffler holding member is a elliptical-shaped, plate type member and made of an elastic material. The conventional type muffler holding member in FIG. 5 has a structure comprising: a first holding part 1a having a first through hole 10a into which a supporting member of an automotive body side is to be inserted, a second holding part 2a formed with a space between said first holding part 1a and having a second through hole 20a into which a supporting member of a muffler side is to be inserted, and a pair of side parts 3a connecting the first holding part 1a and the second holding part 2a at the both sides thereof.

In FIG. 6, another conventional type muffler holding member is illustrated. This type of the muffler holding member is disclosed in the Japanese Unexamined Utility Model Publication (KOKAI) No. 59-186574. In this prior art arrangement, a metal rod is provided as a mass member 4b which is connected to the each side part 3b at the central portion thereof. Accordingly, the mass member 4b resonates with the elastic material composing the muffler holding member. In effect, the vibration transmissibility is gradually absorbed to a zero level. In accordance with this type of the conventional muffler holding member, the vibration transmissibility in the major-axial direction can be lowered. (Hereinafter, the major-axial direction shall mean the direction connecting the first through hole 10a and the second through hole 20a, and the minor-axial direction shall mean the direction connecting the both side parts 3a).

According to the muffler holding member of the conventional type shown in FIG. 5, vibrations caused by the operation of the internal combustion engine and transmitted from the muffler or from the automotive body can be absorbed by the elastic material composing the muffler holding member. However, when tensile/compression stresses are working in the muffler holding member in the major-axial direction, the tensile/compression stresses are applied to the pair of side parts 3a and a part of the tensile/compression stresses is applied as bending stress to the side part 3a. Consequently, a phenomenon of surging occurs by which the pair of side parts 3a vibrates in the minor-axial direction. And if each side part 3a vibrates oppositely in direction by another type of the surging, vibration transmissibility of the muffler holding member in the major-axial direction is increased. As a result of the phenomenon, vibrations at a part apt to be transmitted to other part as well and thereby, the vibration absorbing effect of the muffler holding member is greatly reduced. Generally, vibration transmissibility (absolute spring constant) of the conventional type muffler holding member shown in FIG. 5 is increased at a frequency level exceeding 500 Hz.

On the other hand, the other type of the conventional muffler holding member shown in FIG. 6 is usually effective in lowering the vibration transmissibility at a high frequency level, namely, the frequency exceeding 500 Hz, by the effect of the resonance of the mass member 4b. However, in this type, vibration transmissibility is greatly increased at the frequency level (usually about 200 Hz) corresponds to the intrinsic vibration frequency of the mass member 4b.

In addition, since the mass member 4b vibrates in the minor-axial direction, the vibrations are transmitted to the major-axial direction of the muffler holding member through the side parts 3b forming the muffler holding member. As a result of this effect, rigidity of the muffler holding member in the major-axial direction is decreased.

Further, owing to the presence of the mass member 4b, the vibration transmissibility of the muffler holding member in the major-axial direction tends to increase.

Still further, the frequency of the resonance is changed as the temperature changes, so that the adjustment of tunning is difficult.

Still further, if the mass member 4b is disposed at a slant to the muffler holding member, the resonance direction is changed. Accordingly, the mounting of the mass member 4b to the muffler holding member requires careful manner.

SUMMARY OF THE INVENTION

For obviating the foregoing defects with the prior art, it is an object of the present invention to provide a muffler holding member which is capable of lowering vibration transmissibility in any frequency level (lower than 800 Hz) required to an automobile. The muffler holding member according to the present invention is made of an elastic material and may be formed into an elliptical-shaped, plate type member similar to conventional ones. The following relates to a structure of the muffler holding member of the present invention, which comprises: a first holding part having a first through hole into which a supporting member of an automotive body side is to be inserted, a second holding part formed with leaving a space between the first holding part and having a second through hole into which a supporting member of a muffler side is to be inserted, a pair of side parts connecting the first holding part and the second holding part at the both sides thereof, and a center connecting part positioned in the space between the first holding part and the second holding part and integrally connected to each side part at the central portion thereof.

According to the above-described arrangement, the center connecting part, which is integrally connected to the side parts, is made of an elastic material, and therefore, mainly, tensile and compression stresses are working in the center connecting part.

According to the present invention, conventional arrangement of the first holding part having the first through hole, the second holding part having the second through hole and a pair of side parts can be used.

The center connecting part, which characterises the present invention, is integrally connected to each side part at the central portion thereof and thereby, improving the rigidity of the pair of side parts. The center connecting part is made of an elastic material, and therefore, tensile and compression stresses are working in the center connecting part.

The each end of the center connecting part may be branched off to form two-forked end portions and they are connected to the each side part. In this case, tensile and pressure stresses obliquely working to the pair of side parts can also be dealt with.

The muffler holding member according to the present invention is made of an elastic material which may include natural rubber, synthetic rubber such as EPDM and the like or blended rubber obtained by a blending of natural rubber and synthetic rubber. The whole part of the muffler holding member is preferably formed integrally by vulcanization molding of above listed elastic materials in the mold.

According to the above-described arrangement of the present invention, the following effect can be expected:

When tensile/compression stresses in the major-axial direction are working in the muffler holding member of the present invention, the tensile/compression stresses are applied to the pair of side parts and a part of the stresses is applied as bending stress to the central portion of each side part. Due to the bending stress, a surging which vibrates each side part oppositely in the minor-axial direction occurs. However, according to the present invention, tensile/compression stresses are working in the center connecting part whose ends are respectively connected to each side part at the central portion thereof. Accordingly, the vibrations at the pair of side parts caused by the surging in the minor-axial direction can be moderated to a minimum level. Further, in case of the present invention, because of the presence of the center connecting part, the rigidity between opposed two side parts is increased. Accordingly, the frequency range at which vibration transmissibility of the muffler holding member is increased is at the high frequency range compared to that of the conventional muffler holding member in which the rigidity between opposed two side parts is low because no center connecting part is provided.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

EMBODIMENT 1

Figure 1:
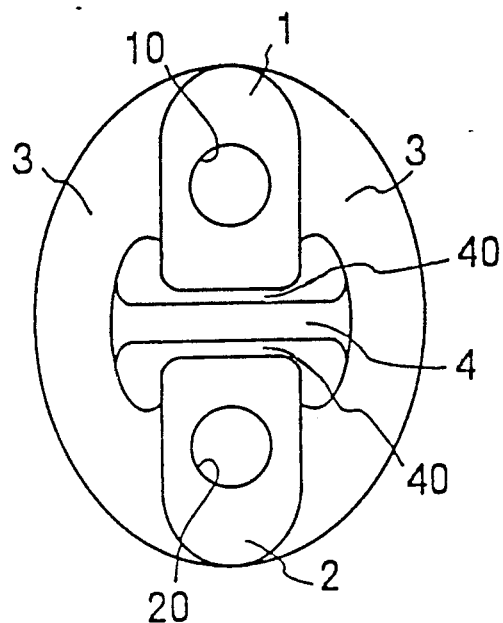
FIG. 1 is an elevation view of a muffler holding member produced in accordance with one embodiment of the present invention.
Figure 2:
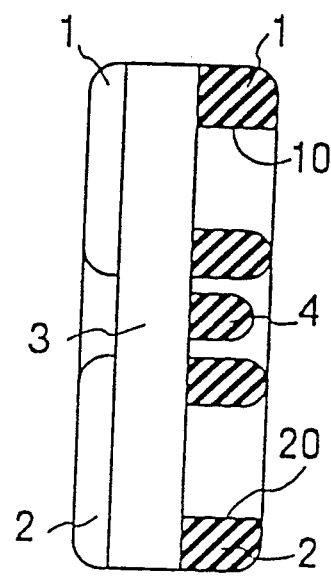
FIG. 2 is a partially sectional view of the muffler holding member of the embodiment shown in FIG. 1 cut the right-hand side half in the middle part thereof.

FIG. 1 is an elevation view of a muffler holding member in accordance with the embodiment 1 of the present invention. FIG. 2 is a partially sectional view of the muffler holding member of the embodiment 1 cut the right-hand side half in the middle part thereof. As shown in FIGS. 1 and 2, the muffler holding member of this embodiment 1 is an elliptical-shaped, plate type member, having lengths of 65 mm in the major-axial direction, 55 mm in the minor-axial direction and a thickness of 25 mm in the thickness direction.

The muffler holding member is produced by a vulcanization molding of EPDM with a mold and the whole member is integrally formed. At the upper part of the major-axial direction of the elliptical-shaped muffler holding member, a first holding part 1 is formed. The first holding part 1 has a first through hole 10 having a diameter of 12 mm on the central portion of the first holding part 1 in the manner that it is extending without a bottom to the thickness direction of the muffler holding member. At the lower part in the major-axial direction of the elliptical-shaped muffler holding member, a second holding part 2 is formed with leaving a space of 10 mm between the first holding part 1. The second holding part 2 has a second through hole 20 having a diameter of 12 mm on the central portion of the second holding part 2 in the manner that it is extending without bottom to the thickness direction of the muffler holding member. The first holding part 1 and the second holding part 2 have an identical shape with each other and they are symmetrically formed with each other with respect to the minor axis of the muffler holding member. Two arc-shaped side parts 3 are formed as a pair in the manner that they are connecting the first and second holding parts 1 and 2 at the both sides thereof. Each arc-shaped side part 3 has a width of 10 mm in the minor-axial direction and a thickness of 20 mm. A center connecting part 4 is formed in the middle part of the space between the first and second holding parts 1 and 2 along the minor axis of the muffler holding member with forming clearances 40 from the first holding part 1, and from the second holding part 2, respectively. The each end of the center connecting part 4 is integrally connected to each side part 3 at the inner surface of the central portion thereof. The thickness of the center connecting part is 20 mm which corresponds to the thickness of the side parts 3. The center connecting part has a width of 6 mm in the major-axial direction.

The above described muffler holding member of the first embodiment 1 in accordance with the present invention is installed in an automobile to hold a muffler to an automotive body in such a manner that a supporting member of the automotive body (not shown in the Figure) is inserted into the first through hole 10, and a supporting member of the muffler (not shown in the Figure) is inserted into the second through hole 20. Accordingly, the muffler holding member of the present invention reduces or absorbs vibrations caused by the operation of the internal combustion engine and transmitted from the muffler or from the automotive body. Accordingly, by the effect of the muffler holding member of the present invention, the transmittance of noise vibrations to the inside of the vehicle is prevented.

The characteristic of the present invention mainly resides in that the muffler holding member has the center connecting part 4, by which rigidity between opposed two side parts 3 is increased. In effect, vibrations in the minor-axial direction caused by the surging at the side parts 3 can be moderated to a minimum level by tensile and compression effects of the center connecting part 4. Accordingly, vibration transmissivility of the muffler holding member is lowered to a minimum level in any frequency level required to an automobile.

EVALUATION TEST 1

In order to prove the superior effect of the muffler holding member in accordance with the present invention, the following evaluation test was performed. The muffler holding members of the present invention and those of the conventional types were tested.

The relation between vibration transmissibility (absolute spring constant) of the muffler holding members and frequency was observed by the use of a dynamic characteristic measuring device.

Figure 5:
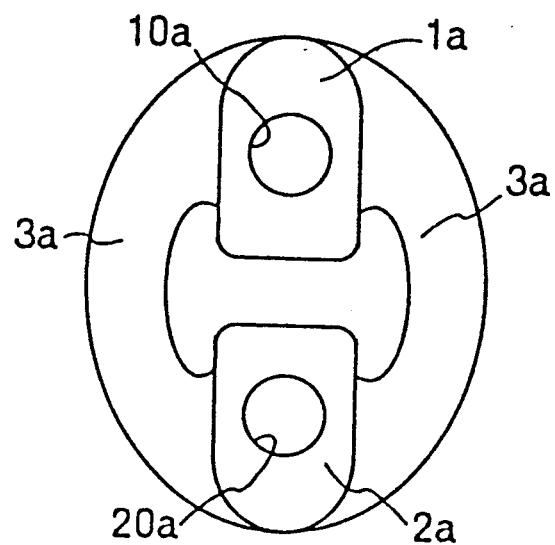
FIG. 5 is an elevation view of one type of the conventional muffler holding member.
Figure 6:
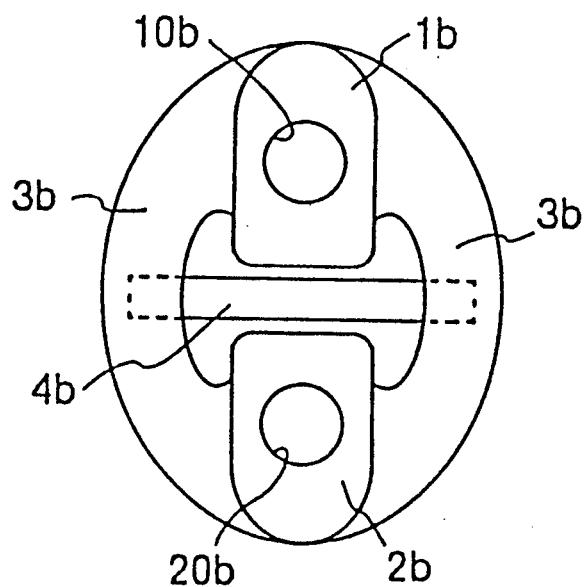
FIG. 6 is an elevation view of another type of the conventional muffler holding member.

The muffler holding member described as the embodiment 1 in accordance with the present invention was prepared, and the following two conventional type muffler holding members shown in FIGS. 5 and 6 were also prepared as prior art examples 1 and 2, respectively:

Prior art example 1:

The muffler holding member of the prior art example 1 had an identical size and structure with those of the embodiment 1 of the present invention other than that it did not have the center connecting part.

Prior art example 2:

The muffler holding member of the prior art example 2 had an identical size and structure with those of the embodiment 1 of the present invention other than that it did not have the center connecting part. It had, however, a metal rod provided as a mass member connected to each side part at the central portion thereof.

The values of dynamic characteristic of the muffler holding member of the present embodiment 1, prior art examples 1 and 2, were measured, respectively in the following manner:

Two rod-shaped metal fittings were prepared.

One end of a rod-shaped metal fitting was inserted into the first through hole of the muffler holding member and the other end of the metal fitting was fixed to a load cell; Also, one end of the other rod-shaped metal fitting was inserted into the second through hole of the muffler holding member, and the other end of the metal fitting was fixed to an oil pressure actuator. In this state, a tensile stress of 5 kgf was statically applied. Then, the actuator is dynamically excited with a sine wave of ±0.03 mm. During the excitation, frequency was swept from 100 Hz to 1000 Hz. From the measured values of dynamic characteristic of the three muffler holding members, amounts of absolute spring constant (kgf/mm) were calculted.

Figure 3:
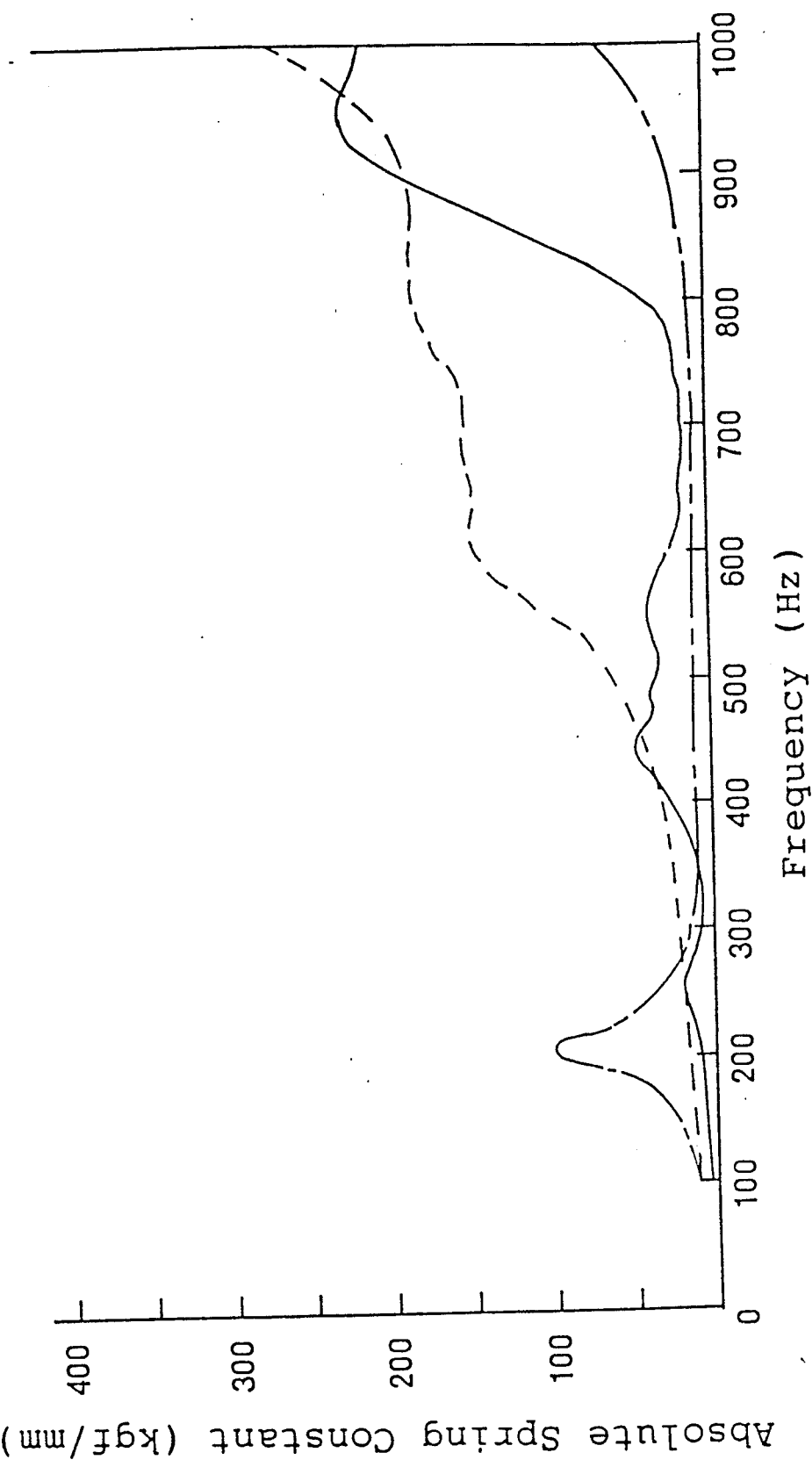
FIG. 3 is a graph showing the relation between the value of absolute spring constant and vibration frequency.

The relations between the calculted values of absolute spring constant and frequency was shown in FIG. 3 in the form of a graph. In the graph, the muffler holding member of the embodiment 1 in accordance with the present invention was shown in a solid line. The prior art example 1 was shown in a broken line and the prior art example 2 was shown in an alternate long and short dash line.

According to the graph in the FIG. 3, although the muffler holding member of the prior art example 1 had a low vibration transmissibility at a frequency level less than 500 Hz, vibration transmissibility was increased at a frequency level exceeding 500 Hz. On the other hand, in the case of the muffler holding member of the prior art example 2, which had the mass member, the vibration transmissibility was low at a frequency level of from 500 to 800 Hz by the effect of the resonance of the mass member. However, at a frequency level of about 200 Hz, which corresponded to the frequency of the intrinsic vibration of the mass member, vibration transmissibility was greatly increased.

Contrary to the results of the two prior art examples 1 and 2, the muffler holding member of the embodiment 1 in accordance with the present invention maintained low value of vibration transmissibility throughout all the frequency level up to 800 Hz.

Namely, it is proved by the results of above described evaluation test 1 that the muffler holding member of the present invention has achieved in lowering vibration transmissibility at a frequency level of from 500 to 800 Hz. Further, the increase in vibration transmissibility at the frequency level corresponds to the frequency of the intrinsic vibration of the mass member, which is the problem of the prior art example 2, will not be brought up in the case of the present invention.

EVALUATION TEST 2

Nextly, compression static spring constant was measured in the major-axial direction and in the minor-axial direction of the elliptical-shaped muffler holding members. Accordingly, spring ratio (spring constant in the minor-axial direction/spring constant in the major-axial direction) was calculated. The compression static spring constant was measured by the use of a static characteristic measuring device. As a result of the calculation, the muffler holding member of the embodiment 1 in accordance with the present invention had a spring ratio of 1.98. The prior art example 1 and 2 had spring ratios of 0.92 and 36, respectively. Generally, spring ratio of from 1.1 to 9 may considered appropriate for the muffler holding members. It is proved by the results of the evaluation test 2 that the muffler holding member of the present invention has achieved to have an ideal value of spring ratio because of the appropriate spring rigidity in the minor-axial direction thereof by the presence of the center connecting part.

EMBODIMENT 2

Figure 4:
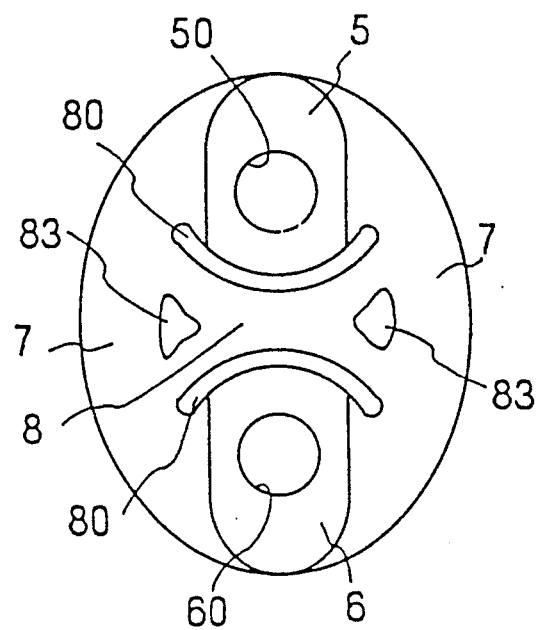
FIG. 4 is an elevation view of a muffler holding member produced in accordance with another embodiment of the present invention.

As is shown in FIG. 4, the center connecting part 8 of this embodiment has two-forked ends. In detail, the two-forked ends of the center connecting part 8 are branched off at an angle of approximately 90 degrees and connected to each side part 7 at the central portion thereof with forming triangular-shaped clearances 83. The center connecting part 8 is formed in the middle part of the space between the first and the second holding parts with forming arc-shaped clearances 80.

Other than the configuration of the center connecting part 8, the muffler holding member of the embodiment 2 in accordance with the present invention has the same arrangement as that of the embodiment 1.

According to the embodiment 2, the ends of the center connecting part 8 are branched off and connected to the side parts. Accordingly, rigidity in the obliquely extending direction of the muffler holding member is increased. As a result, compression and tensile stresses in the minor-axial direction and in the obliquely extending direction are working in the center connecting part 8. Accordingly, the vibration transmissibility of the muffler holding member of the embodiment 2 in accordance with the present invention is further lowered from that of the embodiment 1.

As it has been described above, the characteristic of the muffler holding member in accordance with the present invention resides in that it has the center connecting part integrally connected to each side part at the central portion thereof.

By the tensile stress and compression stress working in the center connecting part, vibrations due to the surging at the side parts are moderated to a minimum level. Accordingly, in the case of the muffler holding member of the present invention, vibration transmissibility is kept low level throughout all the frequency level required to an automobile.

Obviously, numerous modifications and variations of the present invention are possible in light of the above teachings. It is therefore to be understood that within the scope of the appended claim, the invention may be practiced otherwise than as specifically described herein.

What is claimed is:

1. A muffler holding member consisting essentially of elastic material comprising:
   a first holding part having a first through hole into which a supporting member of an automotive body is inserted;
   a second holding part positioned with a space between said first holding part and having a second through hole into which a supporting member of a muffler is inserted;
   a pair of side parts formed integrally with and connecting said first holding part and said second holding part at both sides thereof; and
   a center connecting part positioned in said space between said first holding part and said second holding part and integrally connected to each said side part at the central portion thereof,
   wherein mainly tensile stress and compression stress are working in said center connecting part.

2. The muffler holding member according to claim 1, wherein said center connecting part has branched-off end portions.

3. The muffler holding member according to claim 1, wherein the thicknesses of said first holding part and said second holding part are thicker than the thicknesses of said side parts.

4. The muffler holding member according to claim 3, wherein the thicknesses of said side parts are the same as the thickness of said center connecting part.

5. The muffler holding member of claim 1, wherein said elastic material is natural rubber or synthetic rubber.

6. A muffler holding member consisting essentially of elastic material comprising:
   a first holding part having a first through hole into which a supporting member of an automotive body is inserted;
   a second holding part positioned with a space between said first holding part and having a second through hole into which a supporting member of a muffler is inserted;
   a pair of side parts formed integrally with and connecting said first holding part and said second holding part at both sides thereof; and
   a center connecting part positioned in said space between said first holding part and said second holding part and integrally connected to each said side part at the central portion thereof,
   wherein mainly tensile stress and compression stress are working in said center connecting part, and the vibration transmissibility constant is maintained at a substantially low level at frequencies up to about 800 Hz.

* * * * *